United States Patent
Freeman et al.

(10) Patent No.: US 11,286,812 B1
(45) Date of Patent: Mar. 29, 2022

(54) TURBINE SHROUD ASSEMBLY WITH AXIALLY BIASED PIN AND SHROUD SEGMENT

(71) Applicant: Rolls-Royce Corporation, Indianapolis, IN (US)

(72) Inventors: Ted J. Freeman, Danville, IN (US); Aaron D. Sippel, Zionsville, IN (US); David J. Thomas, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/330,159

(22) Filed: May 25, 2021

(51) Int. Cl.
| *F01D 11/08* | (2006.01) |
| *F01D 25/24* | (2006.01) |
| *F01D 25/00* | (2006.01) |
| *F01D 25/28* | (2006.01) |
| *F01D 11/00* | (2006.01) |

(52) U.S. Cl.
CPC .......... *F01D 25/243* (2013.01); *F01D 11/005* (2013.01); *F01D 25/005* (2013.01); *F01D 25/28* (2013.01); *F05D 2240/14* (2013.01); *F05D 2240/55* (2013.01); *F05D 2260/38* (2013.01); *F05D 2300/6033* (2013.01)

(58) Field of Classification Search
CPC ........ F01D 11/08; F01D 11/005; F01D 25/24; F01D 25/243; F01D 25/246; F05D 2260/38; F05D 2240/11; F05D 2300/6033
See application file for complete search history.

(56) References Cited

U.S. PATENT DOCUMENTS

| 3,066,911 | A | 12/1962 | Anderson et al. |
| 5,203,673 | A | 4/1993 | Evans |
| 5,295,787 | A | 3/1994 | Leonard et al. |
| 5,405,245 | A | 4/1995 | Cornelius |
| 5,459,995 | A | 10/1995 | Norton et al. |
| 5,738,490 | A | 4/1998 | Pizzi |
| 6,821,085 | B2 | 11/2004 | Darkins, Jr. et al. |
| 6,877,952 | B2 | 4/2005 | Wilson |
| 6,884,026 | B2 | 4/2005 | Glynn et al. |
| 7,210,899 | B2 | 5/2007 | Wilson |
| 7,416,362 | B2 | 8/2008 | North |
| 7,494,317 | B2 | 2/2009 | Keller et al. |
| 7,534,086 | B2 | 5/2009 | Mazzola et al. |
| 7,874,059 | B2 | 1/2011 | Morrison et al. |
| 8,944,756 | B2 | 2/2015 | Lagueux |
| 8,985,944 | B2 | 3/2015 | Shapiro et al. |
| 9,188,062 | B2 * | 11/2015 | Tsutsumi ............. F01D 11/003 |

(Continued)

*Primary Examiner* — David E Sosnowski
*Assistant Examiner* — Maxime M Adjagbe
(74) *Attorney, Agent, or Firm* — Barnes & Thornburg LLP

(57) ABSTRACT

A turbine shroud assembly includes a carrier assembly, a blade track assembly, and a first biasing member. The carrier assembly includes a carrier segment having an outer wall, a first mount flange and a second mount flange having a chordal seal. The blade track assembly includes a blade track segment and a first mount pin. The first biasing member is arranged axially between and engaged with a retainer plug of the first mount pin and a pin segment of the first mount pin such that a portion of the pin segment engages an attachment feature of the blade track segment so as to bias the attachment feature into engagement with the chordal seal of the second mount flange.

20 Claims, 7 Drawing Sheets

(56) References Cited

U.S. PATENT DOCUMENTS

| | | | |
|---|---|---|---|
| 9,518,474 B2 | 12/2016 | Shapiro et al. | |
| 9,587,517 B2 | 3/2017 | Vetters et al. | |
| 9,598,975 B2 | 3/2017 | Uskert et al. | |
| 9,863,265 B2 * | 1/2018 | Stapleton | F01D 11/08 |
| 9,874,104 B2 | 1/2018 | Shapiro | |
| 9,926,801 B2 | 3/2018 | Uskert et al. | |
| 9,945,242 B2 | 4/2018 | Fitzpatrick et al. | |
| 10,030,541 B2 | 7/2018 | Vetters et al. | |
| 10,215,056 B2 | 2/2019 | Sippel et al. | |
| 10,301,960 B2 * | 5/2019 | Stapleton | F01D 9/042 |
| 10,316,687 B2 | 6/2019 | Uskert et al. | |
| 10,378,385 B2 | 8/2019 | Tesson et al. | |
| 10,378,386 B2 | 8/2019 | Roussille et al. | |
| 10,590,803 B2 | 3/2020 | Quennehen et al. | |
| 10,619,514 B2 | 4/2020 | Walston et al. | |
| 10,619,517 B2 * | 4/2020 | Quennehen | F01D 25/28 |
| 10,655,501 B2 | 5/2020 | Lepretre et al. | |
| 10,690,007 B2 | 6/2020 | Quennehen et al. | |
| 10,774,008 B2 | 9/2020 | Subramanian et al. | |
| 10,815,810 B2 | 10/2020 | Barker et al. | |
| 10,858,959 B2 | 12/2020 | Maar | |
| 2014/0366556 A1 | 12/2014 | Banks et al. | |
| 2016/0177786 A1 | 6/2016 | Sippel et al. | |
| 2016/0348523 A1 | 12/2016 | Thomas et al. | |
| 2017/0009594 A1 | 1/2017 | Snyder et al. | |
| 2018/0051590 A1 * | 2/2018 | Tableau | F01D 11/08 |
| 2018/0051629 A1 | 2/2018 | Teixeira | |
| 2018/0340440 A1 | 11/2018 | Freeman et al. | |
| 2019/0040758 A1 | 2/2019 | Quennehen et al. | |
| 2019/0040761 A1 | 2/2019 | Carlin et al. | |
| 2019/0128132 A1 | 5/2019 | Tableau et al. | |
| 2020/0224544 A1 * | 7/2020 | Barker | F01D 25/243 |
| 2020/0256215 A1 | 8/2020 | Walston et al. | |

\* cited by examiner

TURBINE SHROUD ASSEMBLY WITH AXIALLY BIASED PIN AND SHROUD SEGMENT

FIELD OF DISCLOSURE

The present disclosure relates generally to gas turbine engines, and more specifically to biasing features for turbine shrouds adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

A turbine shroud assembly for use with a gas turbine engine includes a carrier assembly, a blade track assembly, and a first biasing member. The carrier assembly including a carrier segment made of metallic materials and arranged circumferentially at least partway around an axis, the carrier segment having an outer wall, a first mount flange that extends radially inward from the outer wall, and a second mount flange axially spaced apart from the first mount flange and that extends radially inward from the outer wall, the second mount flange including a radially extending wall and a chordal seal that extends axially away from the radially extending wall In some embodiments, the blade track assembly includes a blade track segment made of ceramic matrix composite materials and a first mount pin assembly, the blade track assembly supported by the carrier to locate the blade track segment radially outward of the axis and define a portion of a gas path of the turbine shroud assembly, and the blade track segment including a shroud wall that extends circumferentially partway around the axis and an attachment feature that extends radially outward from the shroud wall, and the first mount pin assembly including a retainer plug extending axially into the first mount flange and a pin segment extending axially away from the retainer plug, through the attachment feature, and into the second mount flange so as to couple the blade track assembly to the carrier segment.

In some embodiments, the first biasing member is arranged axially between and engaged with the retainer plug of the first pin mount assembly and the pin segment such that a portion of the pin segment engages the attachment feature of the blade track segment so as to bias the attachment feature into engagement with the chordal seal of the second mount flange.

In some embodiments, the attachment feature includes a first attachment post that extends radially outward from the shroud wall and that defines an axially forward facing surface, and a second attachment post that extends radially outward from the shroud wall and that is axially spaced apart from the first attachment post, wherein the pin segment includes a first step defining an axially facing step face, and wherein the axially facing step face abuts the axially forward facing surface of the first attachment post such that the biasing of the pin segment via the first biasing member biases the axially facing step face into the first attachment post and the second attachment post into sealing engagement with the chordal seal.

In some embodiments, the attachment feature is located axially between the first mount flange and the second mount flange.

In some embodiments, the first mount flange includes an axially-extending installation aperture that receives a portion of the retainer plug and a portion of the pin segment such that the first biasing member is located within the axially-extending installation aperture.

In some embodiments, the carrier segment further includes a third mount flange that extends radially inward from the outer wall of the carrier segment, wherein the third mount flange is located axially between the first mount flange and the second mount flange, and wherein the pin segment extends axially through the first attachment post, the third mount flange, and the second attachment post.

In some embodiments, the carrier segment further includes a fourth mount flange that extends radially inward from the outer wall of the carrier segment and that is spaced apart from and located axially aft of the third mount flange, wherein the third mount flange is located axially between the first mount flange and the fourth mount flange, wherein the fourth mount flange is located axially between the third mount flange and the second mount flange, and wherein the pin segment extends axially through the first attachment post, the third mount flange, the fourth mount flange, and the second attachment post.

In some embodiments, the first attachment post is located axially between the first mount flange and the third mount flange, and wherein the second attachment post is located axially between the fourth mount flange and the second mount flange.

In some embodiments, the radially extending wall of the second mount flange includes an axially extending recess within which an axial end of the pin segment is arranged, and wherein an axial space is formed between the axial end of the pin segment and an inner axial wall of the recess.

In some embodiments, the pin segment is a split-pin fastener that includes a forward pin that extends into the first mount flange, through the first attachment post, and through the third mount flange, and an aft pin circumferentially aligned with and aft of the forward pin that extends through the fourth mount flange, through the second attachment post, and into the second mount flange, and wherein the forward pin is separate from the aft pin so as to allow for independent loading during use in the gas turbine engine.

In some embodiments, the forward pin includes an aft axial end face and a connection tab having a smaller diameter than the forward pin that extends axially away from the aft axial end face, and wherein the aft pin includes a forward axial end face and a connection pocket that receives the connection tab, and wherein the connection tab and connection pocket are sized such that the aft axial end face of the forward pin and the forward axial end face of the aft pin contact each other.

In some embodiments, the attachment feature includes a first attachment post that extends radially outward from the shroud wall and a second attachment post that extends radially outward from the shroud wall, that is spaced apart from and located axially aft of the first attachment post, and that defines an axially forward facing surface, wherein the pin segment includes a first step defining an axially facing step face, and wherein the axially facing step face abuts the axially forward facing surface of the second attachment post such that the biasing of the pin segment via the first biasing member biases the axially facing step face into the second attachment post and the second attachment post into engagement with the chordal seal.

In some embodiments, the carrier segment further includes a third mount flange that extends radially inward from the outer wall of the carrier segment, wherein the third mount flange is located axially between the first mount flange and the second mount flange, and wherein the first attachment post is located axially between the first mount flange and the third mount flange and the second attachment post is located axially between the third mount flange and the second mount flange.

In some embodiments, the first mount flange includes an axially-extending installation aperture that receives a portion of the retainer plug and a portion of the pin segment such that the first biasing member is located within the axially-extending installation aperture.

A turbine shroud assembly for use with a gas turbine engine includes a carrier segment, a blade track assembly, and a first biasing member. The carrier segment is arranged circumferentially at least partway around an axis, the carrier segment having a first mount flange that extends radially inward and a second mount flange axially spaced apart from the first mount flange and that extends radially inward, the second mount flange including a radially extending wall and a chordal seal that extends axially away from the radially extending wall.

In some embodiments, the blade track assembly includes a blade track segment and a first mount pin assembly, the blade track segment including a shroud wall and an attachment feature that extends radially outward from the shroud wall, and the first mount pin assembly coupling the blade track assembly to the carrier segment and including a retainer plug extending axially into one of the first mount flange and a pin segment extending axially away from the retainer plug, and In some embodiments, the first biasing member is arranged axially between and engaged with the retainer plug of the first pin mount assembly and the pin segment such that a portion of the pin segment engages the attachment feature of the blade track segment so as to bias the attachment feature into engagement with the chordal seal of the second mount flange.

In some embodiments, the attachment feature includes a first attachment post that extends radially outward from the shroud wall and that defines an axially forward facing surface, wherein the pin segment includes a first step defining an axially facing step face, and wherein the axially facing step face abuts the axially forward facing surface of the first attachment post such that the biasing of the pin segment via the first biasing member biases the axially facing step face into the first attachment post and the blade track segment into sealing engagement with the chordal seal.

In some embodiments, the first mount flange includes an axially-extending installation aperture that receives a portion of the retainer plug and a portion of the pin segment such that the first biasing member is located within the axially-extending installation aperture.

In some embodiments, the first mount pin assembly is a split-pin fastener that includes a forward pin that extends into the first mount flange and an aft pin circumferentially aligned with and aft of the forward pin that extends into the second mount flange, and wherein the forward pin is separate from the aft pin so as to allow for independent loading during use in the gas turbine engine.

In some embodiments, the forward pin includes an aft axial end face and a connection tab having a smaller diameter than the forward pin that extends axially away from the aft axial end face, and wherein the aft pin includes a forward axial end face and a connection pocket that receives the connection tab, and wherein the connection tab and connection pocket are sized such that the aft axial end face of the connection tab and the forward axial end face of the aft pin contact each other.

In some embodiments, the second mount flange includes an axially-extending installation aperture that receives a portion of the retainer plug and a portion of the pin segment such that the first biasing member is located within the axially-extending installation aperture, and wherein the first biasing member exerts a pulling biasing force on the pin segment.

A method of forming a turbine shroud assembly includes providing a carrier assembly including a carrier segment made of metallic materials and is arranged circumferentially around an axis, the carrier segment having an outer wall, a first mount flange that extends radially inward from the outer wall, and a second mount flange axially spaced apart from the first mount flange and that extends radially inward from the outer wall, the second mount flange including a radially extending wall and a chordal seal that extends axially away from the radially extending wall.

In some embodiments, the method further includes providing a blade track assembly including a blade track segment made of ceramic matrix composite materials and a first mount pin assembly, the blade track assembly supported by the carrier to locate the blade track segment radially outward of the axis and define a portion of a gas path of the turbine shroud assembly, and the blade track segment including a shroud wall that extends circumferentially partway around the axis and an attachment feature that extends radially outward from the shroud wall.

In some embodiments, the method further includes coupling the black track assembly to the carrier segment via the first mount pin assembly, the first mount pin assembly including a retainer plug extending axially into the first mount flange and a pin segment extending axially away from the retainer plug, through the attachment feature, and into the second mount flange.

In some embodiments, the method further includes arranging the first biasing member axially between the retainer plug of the first pin mount assembly and the pin segment such that a portion of the pin segment engages the attachment feature of the blade track segment so as to bias the attachment feature into sealing engagement with the chordal seal of the second mount flange.

These and other features of the present disclosure will become more apparent from the following description of the illustrative embodiments.

DETAILED DESCRIPTION OF THE DRAWINGS

Figure 1:
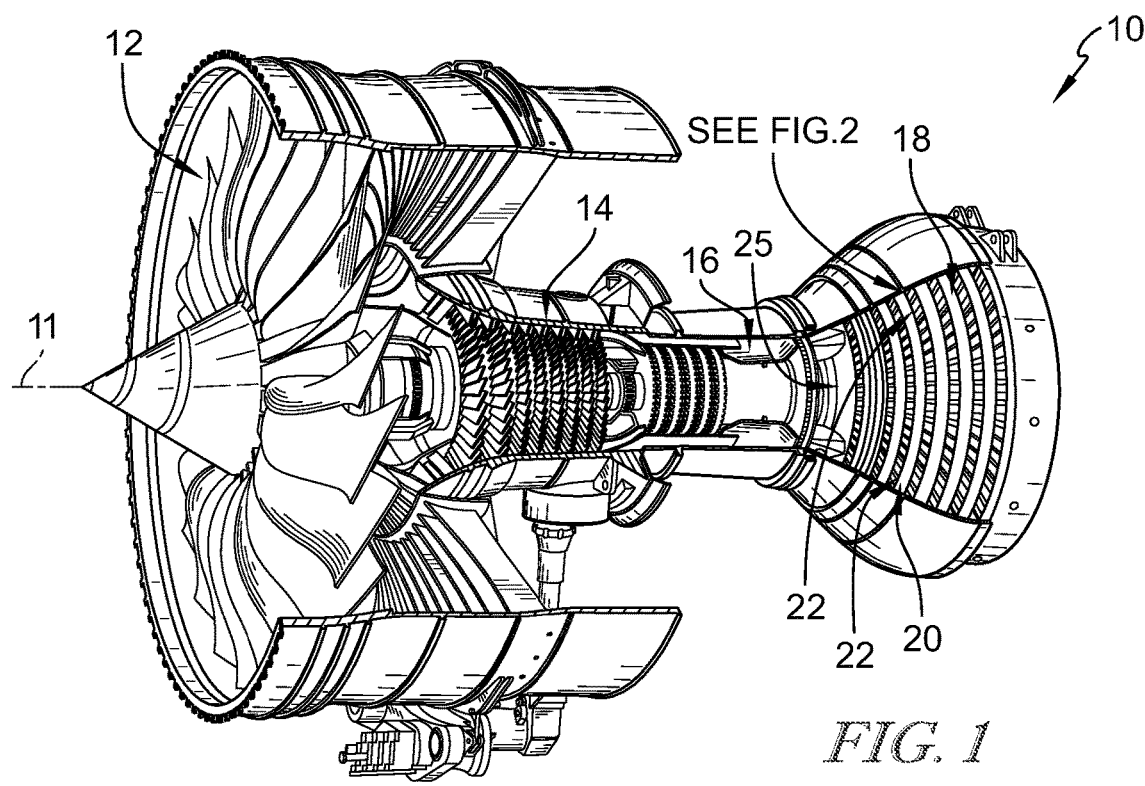
FIG. 1 is a cutaway perspective view of a gas turbine engine that includes a fan, a compressor, a combustor, and a turbine, the turbine includes a turbine shroud assembly that extended circumferentially around the axis and turbine wheels that are driven to rotate about an axis of the engine to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
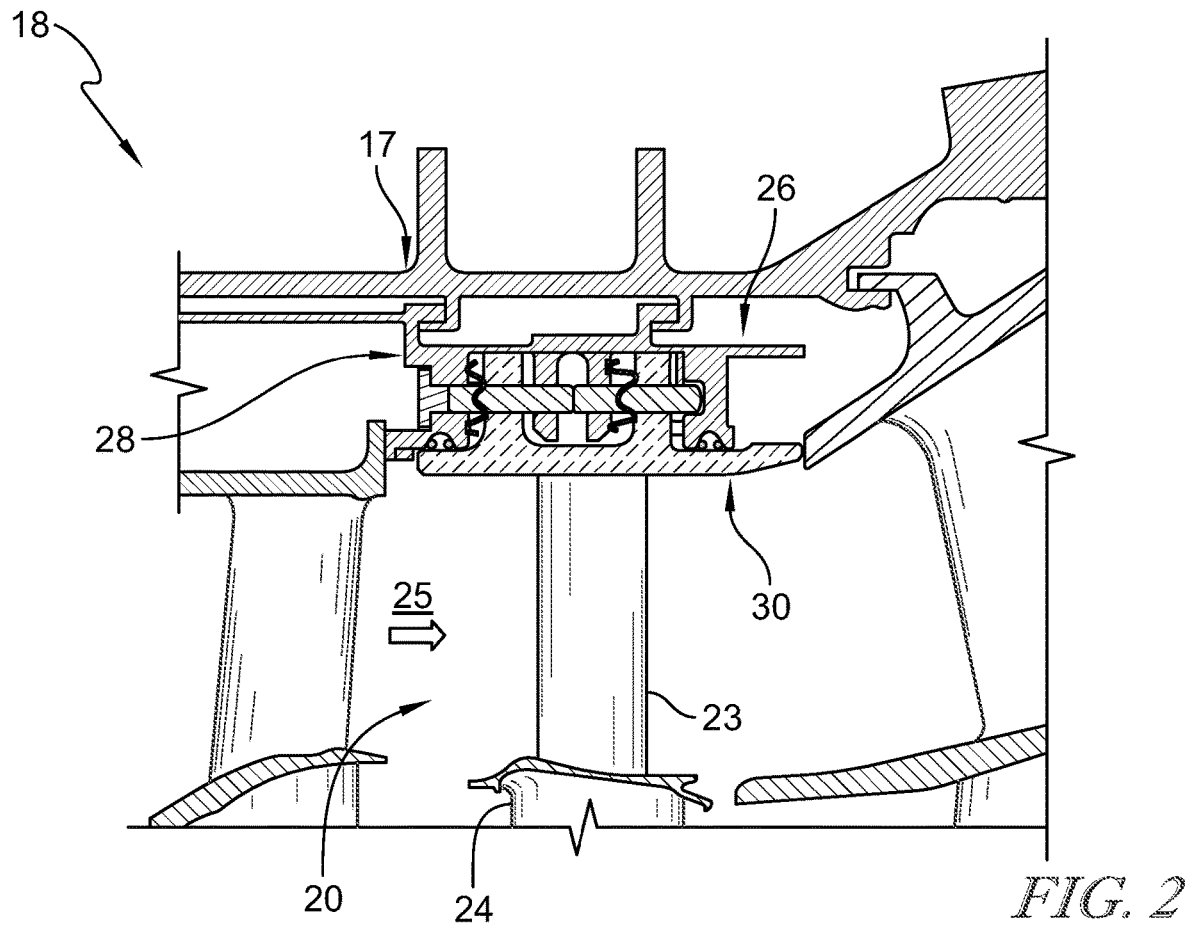
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a blade track assembly having a mount pin and a blade track segment, a carrier segment, and a biasing members located between radially extending flanges of the carrier segment and attachment features of the blade track assembly so as to bias an attachment feature of the black track segment into sealing engagement with a chordal seal of an aft flange.

The turbine section 18 includes at least one turbine wheel assembly 20 and a turbine shroud 22 positioned to surround the turbine wheel assembly 20 as shown in FIGS. 1 and 2. The turbine wheel assembly 20 includes a plurality of blades 23 coupled to a rotor disk 24 for rotation with the disk 24. The hot, high pressure combustion products from the combustor 16 are directed toward the blades 23 of the turbine wheel assemblies 20 along a flow path 25. The turbine shroud 22 is coupled to an outer case 17 of the gas turbine engine 10 and extends around the turbine wheel assembly 20 to block gases from passing over the turbine blades 23 during use of the turbine section 18 in the gas turbine engine 10.

In the illustrative embodiment, the turbine shroud 22 is made up of a number of turbine shroud assemblies 26 that each extend circumferentially partway around the axis 11 and cooperate to surround the turbine wheel assembly 20. In other embodiments, the turbine shroud 22 is annular and non-segmented to extend fully around the central axis 11 and surround the turbine wheel assembly 20. In yet other embodiments, certain components of the turbine shroud 22 are segmented while other components are annular and non-segmented.

Figure 3:
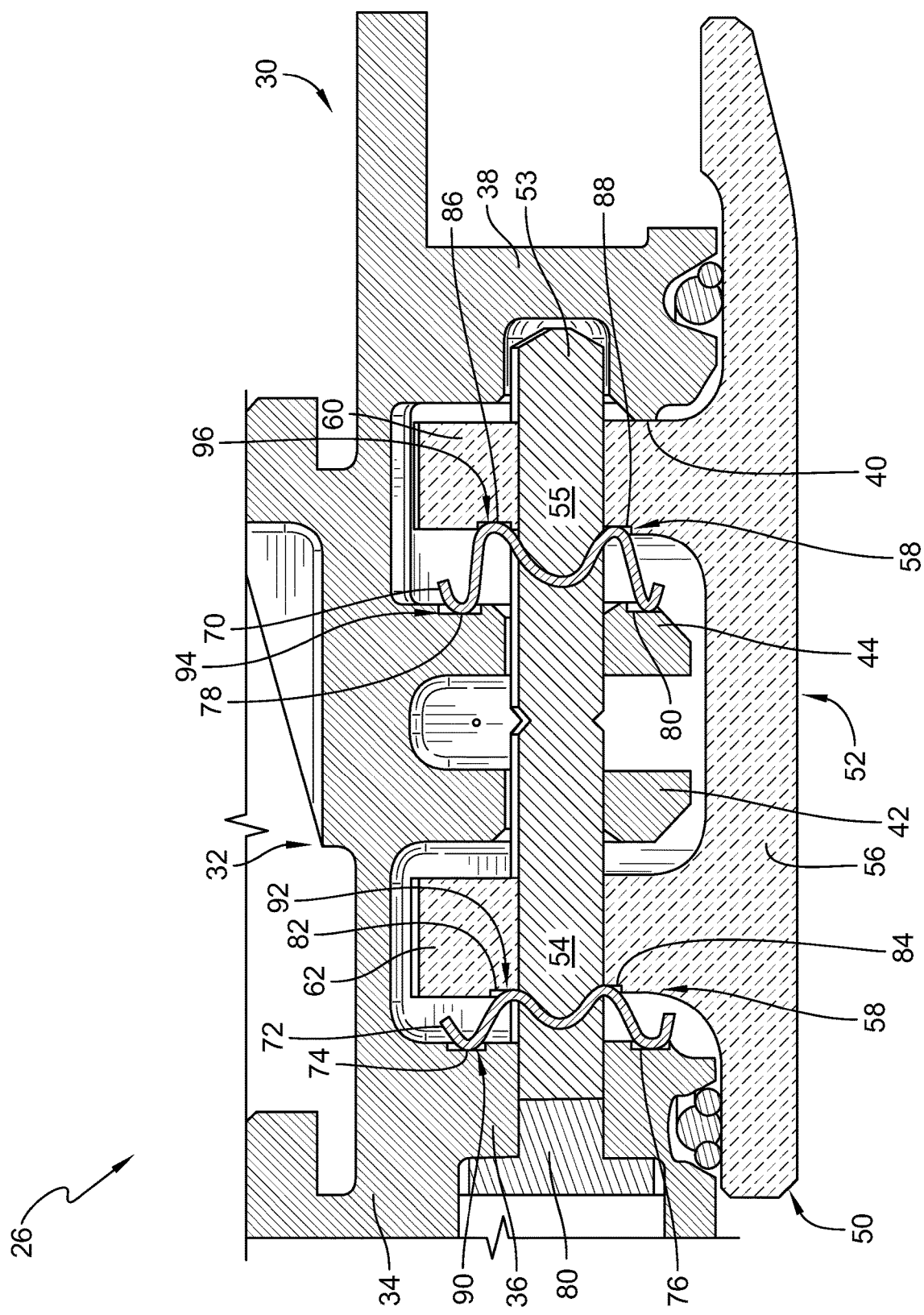
FIG. 3 is detailed view of the turbine shroud of FIG. 2 showing that the turbine shroud includes a carrier segment, forward, aft flanges, and inner flanges, a blade track segment with radially extending attachment features, a mount pin, and forward and aft wave springs each located axially between a flange and an attachment feature, the wave springs biasing each attachment feature of the black track segment such that the aft attachment feature is biased into sealing engagement with the chordal seal of the aft flange.
Figure 4:
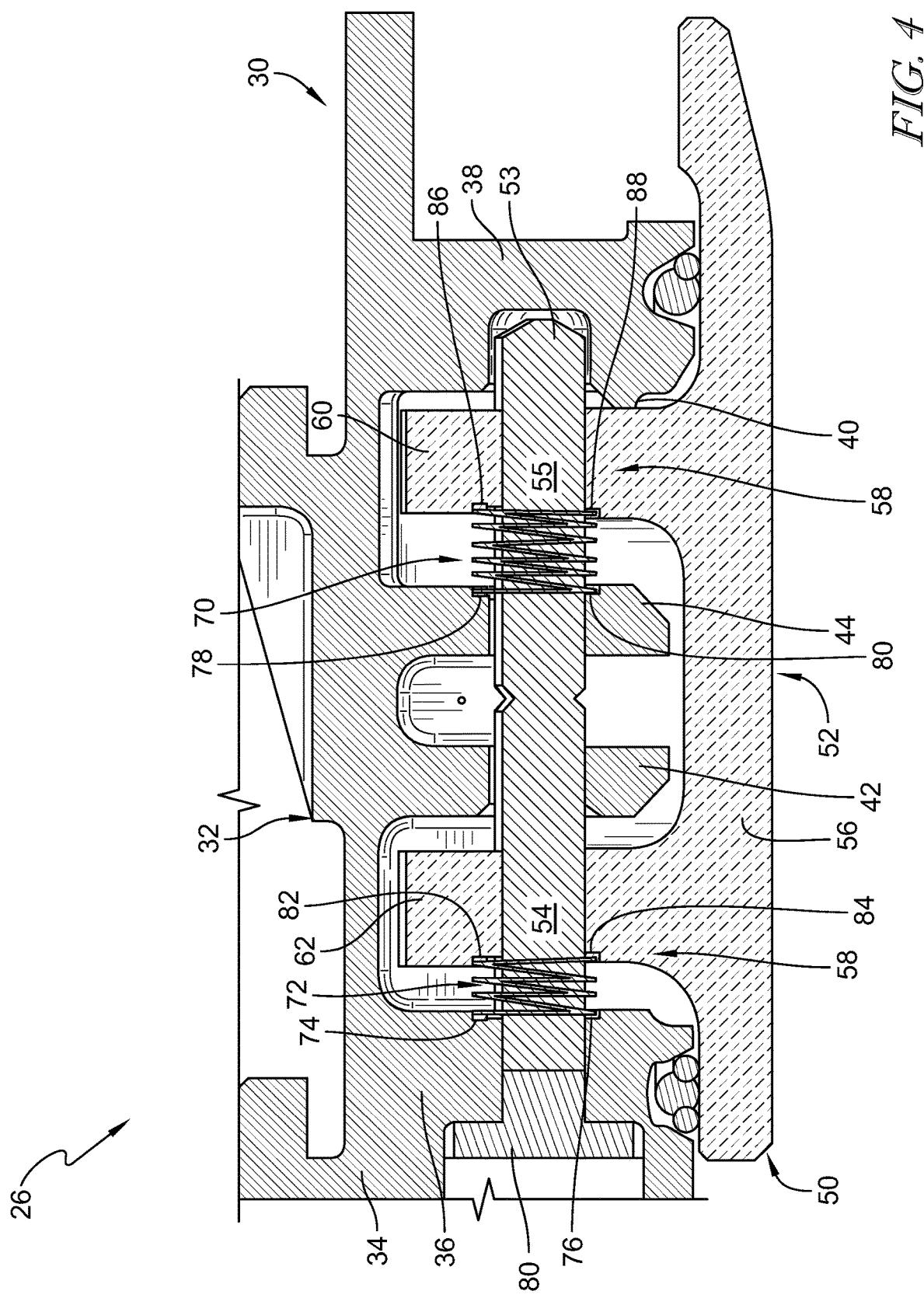
FIG. 4 is detailed view of the turbine shroud of FIG. 2 showing that the turbine shroud includes forward and aft ring springs each located axially between a flange and an attachment feature, the ring springs biasing each attachment feature of the black track segment such that the aft attachment feature is biased into sealing engagement with the chordal seal of the aft flange.

Each turbine shroud assembly 26 includes a carrier assembly 30, a blade track assembly 50, and at least one biasing member 70, as shown in FIGS. 2-4. The carrier assembly 30 includes a carrier segment 32 made of metallic materials and arranged circumferentially around the axis 11. In the illustrative embodiment, the carrier segment 32 includes radially outward extending flanges that are radially aligned with each other and couple to the turbine outer case 17. The carrier segment 32 further includes an outer wall 34 that extends circumferentially partway around the axis 11. A first mount flange 36 extends radially inward from the outer wall 34. A second mount flange 38 is axially spaced apart from the first mount flange 36 and extends radially inward from the outer wall 34. The first mount flange 36 and the second mount flange 38 each also include a circumferential extent that extends along the circumferential extent of the outer wall 34. The first mount flange 36 and the second mount flange 38 may be first and second faces of the carrier segment.

In the illustrative embodiment, the first mount flange 36 is located at an axially forward end of the outer wall 34 and the second mount flange 38 is located at an axially aft end of the outer wall 34, as shown in FIGS. 2-4. The second mount flange 38 includes a radially extending wall 39 and a chordal seal 40 that extends axially away from the radially extending wall 39. The chordal seal 40 may, in addition to extending axially away from the wall 39, also extend circumferentially along the circumferential extent of the second mount flange 38 so as to seal off gases flowing along the gas path 15 radially within the blade track assembly 50.

The blade track assembly 50 of the turbine shroud assembly 26 includes a blade track segment 52 and a first mount pin assembly 53, as shown in FIGS. 2 and 3. The blade track segment 52 is made of ceramic matrix composite materials and extends circumferentially partway around the axis 11. The blade track assembly 50 is supported by the carrier segment 32 to locate the blade track segment 52 radially outward of the axis 11 and define a portion of the gas path 15. The pin assembly 53 may be fixedly held in position via a retainer plug 80.

The blade track segment 52 includes a shroud wall 56 and at least one attachment feature 58, as shown in FIGS. 2-4. The shroud wall 56 is arcuate and extends circumferential partway around the axis 11 and extends a limited axial distance across the axis 11. The shroud wall 56 may extend beyond the second mount flange 38 in an axially aft direction. The shroud wall 56 includes a radially inner surface 57 that faces the gas path 15, and a radially outer surface 59 that faces outwardly towards the carrier assembly 30. The inner surface 57 cooperates with the turbine wheel assembly 22 to block hot gases in the gas path 15 from passing over the top of the turbine wheel assembly 22.

The at least one attachment feature 58 extends radially outward from the outer surface 59 of the shroud wall 56, as shown in FIGS. 2-4. In the illustrative embodiment, the at least one attachment feature 58 includes a first attachment post 60 and a second attachment post 62 that is spaced apart from and located axially aft of the first attachment post 60. The first attachment post 60 may extend radially away from the shroud wall 56 the same distance as the second attachment post 62, although in other embodiments, the first and second attachment posts 60, 62 may extend differing distances from the shroud wall 56. The first attachment post 60 and the second attachment post 62 provide structure for coupling the blade track segment 52 to the carrier assembly 30.

In the illustrative embodiment, the carrier segment 32 further includes a third mount flange 42 that extends radially inward from the outer wall 34 of the carrier segment 32 and a fourth mount flange 44 that extends radially inward from the outer wall 34 of the carrier segment and that is spaced apart from and located axially aft of the third mount flange 42, as shown in FIGS. 3 and 4. The third and fourth mount flanges 42, 44 may be inner mount flanges or clevises that are both located axially inward of the first mount flange 36 and the second mount flange 38. The shroud wall 56 of the blade track segment 52 may include a radially thicker central section axially aligned with the third and fourth mount flanges 42, 44. As a result, the third and fourth mount flanges 42, 44 may extend a shorter distance radially away from the outer wall 34 than the first and second mount flanges 36, 38. In some embodiments, the carrier segment 32 may only include a third mount flange 42 that is axially thicker so as to occupy a similar amount of axial space as the embodiments including both third and fourth mount flanges.

The first attachment post 60 extends radially outwardly such that the first attachment post 60 is located axially between the first mount flange 36 and the third mount flange 42, as shown in FIGS. 2-4. The second attachment post 62 extends radially outwardly such that the second attachment post 62 is located axially between the fourth mount flange 44 and the second mount flange 38. The first mount flange 36 includes an axially aft facing surface 41 and the first attachment post 60 includes an axially forward facing surface 43. The fourth mount flange 44 includes an axially aft facing surface 45 and the second attachment post 62 includes an axially forward facing surface 47.

The turbine shroud assembly 26 includes a first biasing member 70 located axially between the first mount flange 36 and the first attachment post 60, as shown in FIGS. 3 and 4. The first biasing member 70 abuts the axially aft facing surface 41 of the first mount flange 36 and the axially forward facing surface 43 of the first attachment post 60 such that the first biasing member 70 biases the entire blade track segment 52 axially aft such that an axially aft facing wall 49 of the second attachment post 62 contacts an axially forward facing surface of the chordal seal 40. The contact between the chordal seal 40 and the second attachment post 62 creates a seal that prevent hot gases flowing along the gas path 15 from escaping radially outwardly.

In the illustrative embodiment, the turbine shroud assembly 26 further includes a second biasing member 72 located axially between the fourth mount flange 44 and the second attachment post 62, as shown in FIGS. 3 and 4. The second biasing member 72 abuts the axially aft facing surface 45 of the fourth mount flange 44 and the axially forward facing surface 47 of the second attachment post 62 such that the second biasing member 72 biases the entire blade track segment 52 axially aft such that the axially aft facing wall 49 of the second attachment post 62 contacts the axially forward facing surface of the chordal seal 40.

The first mount flange 36 includes a radially outer biasing member recess 74 formed within the first mount flange 36 that is recessed away from the axially aft facing wall 41, as shown in FIGS. 3 and 4. The first mount flange 36 may also include a radially inner biasing member recess 76 formed within the first mount flange 36 that is recessed away from the axially aft facing wall 41. Likewise, the fourth mount flange 44 includes a radially outer biasing member recess 78 formed within the fourth mount flange 44 that is recessed away from the axially aft facing wall 45. The fourth mount flange 44 may also include a radially inner biasing member recess 80 formed within the fourth mount flange 44 that is recessed away from the axially aft facing wall 45.

In the illustrative embodiment, the first attachment post 60 also includes a radially outer biasing member recess 82 formed within the first attachment post 60 that is recessed away from the axially forward facing wall 43, as shown in FIGS. 3 and 4. The first attachment post 60 may also include a radially inner biasing member recess 84 formed within the first attachment post 60 that is recessed away from the axially forward facing wall 43. The second attachment post 62 also includes a radially outer biasing member recess 86 formed within the second attachment post 62 that is recessed away from the axially forward facing wall 47. The second attachment post 62 may also include a radially inner biasing member recess 88 formed within the second attachment post 62 that is recessed away from the axially forward facing wall 47.

Each of the biasing member recesses 74, 76, 78, 80, 82, 84, 86, 88 is configured to receive a portion of the biasing members 70, 72, as shown in FIGS. 3 and 4. The shape and number of recesses depends on the type of biasing member that is used in the turbine shroud assembly 26. For example, the first and second biasing members 70, 72 may each be formed as a wave spring, as shown in FIG. 3. The first wave spring 70 may have at least one curved portion 90 that is arranged in the recess 74 formed in the axially aft facing surface 41 of the first mount flange 36. The first wave spring 70 may have at least one second curved portion 92 that is arranged in the recess 82 formed in the axially forward facing surface 43 of the first attachment post 60.

In the illustrative embodiment, the second wave spring 72 may have at least one curved portion 94 that is arranged in the recess 78 formed in the axially aft facing surface 45 of the fourth mount flange 44. The second wave spring 72 may have at least one second curved portion 96 that is arranged in the recess 86 formed in the axially forward facing surface 47 of the second attachment post 62. Each of the first and second wave springs 70, 72 may have additional curves, some of which would be located within the recesses 76, 80, 84, and 88, as shown in FIG. 3.

In the illustrative embodiment, each wave spring 70, 72 is a linear wave spring that includes an elongated, relatively flat body having the curves described above, as shown in FIGS. 2 and 3. Each linear wave spring 70, 72 extends radially and is arranged circumferentially adjacent to the first mount pin assembly 53. Each biasing member recess 74, 76, 78, 80, 82, 84, 86, 88 is formed to have walls matching the general shape of the outer linear edges of the wave springs 70, 72 such that the wave springs 70, 72 fit securely within the recess 74, 76, 78, 80, 82, 84, 86, 88.

Alternatively, the first biasing member 70 and the second biasing member 72 may be formed as annular ring springs that circumferentially surround the first mount pin assembly 53, as shown in FIG. 4. In this embodiment, the biasing member recesses may be formed as annular recesses such that the annular ends of the ring springs 70, 72 may fit within the recesses. As shown in FIG. 4, the annular recess formed in the axially aft facing surface 41 of the first mount flange 36 may include a radially outer portion 75 and a radially inner portion 77. The annular recess formed in the axially forward facing surface 43 of the first attachment post 60 may include a radially outer portion 79 and a radially inner portion 81. The annular recess formed in the axially aft facing surface 45 of the fourth mount flange 44 may include a radially outer portion 83 and a radially inner portion 85. The annular recess formed in the axially forward facing surface 47 of the second attachment post 62 may include a radially outer portion 87 and a radially inner portion 89.

In the embodiments discussed above, the turbine shroud assembly 26 includes both a first and second attachment post 60, 62, and both a first and second biasing member 70, 72. In other embodiments, the turbine shroud assembly 26 may include a single biasing member located between one of the first mount flange 36 and the first attachment post 60 or the fourth mount flange 44 and the second attachment post 62. Likewise, the turbine shroud assembly 26 may only include a single, fully radially extending attachment post that extends nearly to the inner surface of the outer wall 34. For example, the turbine shroud assembly 26 may only include the second attachment post 62, and only a single biasing spring located between the fourth mount flange 44 and the second attachment post 62. As a further example, the turbine shroud assembly 26 may only include the first attachment post 60, and only a single biasing spring located between the first mount flange 36 and the first attachment post 60. In this case, the blade track assembly 52 includes a radially extending wall where the second attachment post 62 is located in FIGS. 3 and 4, but that only extends radially outward far enough such that it contacts the chordal seal 40. This configuration including the radially extending wall that only extends far enough such that it contacts the chordal seal 40 is applicable to all other embodiments disclosed herein.

In the illustrative embodiment, the turbine shroud assembly 26 includes the first mount pin assembly 53, as shown in FIGS. 2-4. In some embodiments, the first mount pin assembly 53 is formed as a single pin that is inserted through the first mount flange 36, as shown in FIG. 3. The first mount pin assembly 53 may have a circular cross-section, or may have any other suitable cross-section. The first mount pin assembly 53 may be formed as a single monolithic pin that extends through the first mount flange 36, the first attachment post 60, the third and fourth mount flanges 42, 44, the second attachment post 62, and into the second mount flange 38.

In other embodiments, the first mount pin assembly 53 is a split-pin fastener that includes a forward pin 54 that extends into the first mount flange 36, through the first attachment post 60, and through the third mount flange 42, and an aft pin 55 circumferentially aligned with and aft of the forward pin 54 that extends through the fourth mount flange 44, through the second attachment post 62, and into the second mount flange 38, and shown in FIG. 4. The forward pin 54 is separate from the aft pin 55 so as to allow for independent loading during use in the gas turbine engine.

Figure 5:
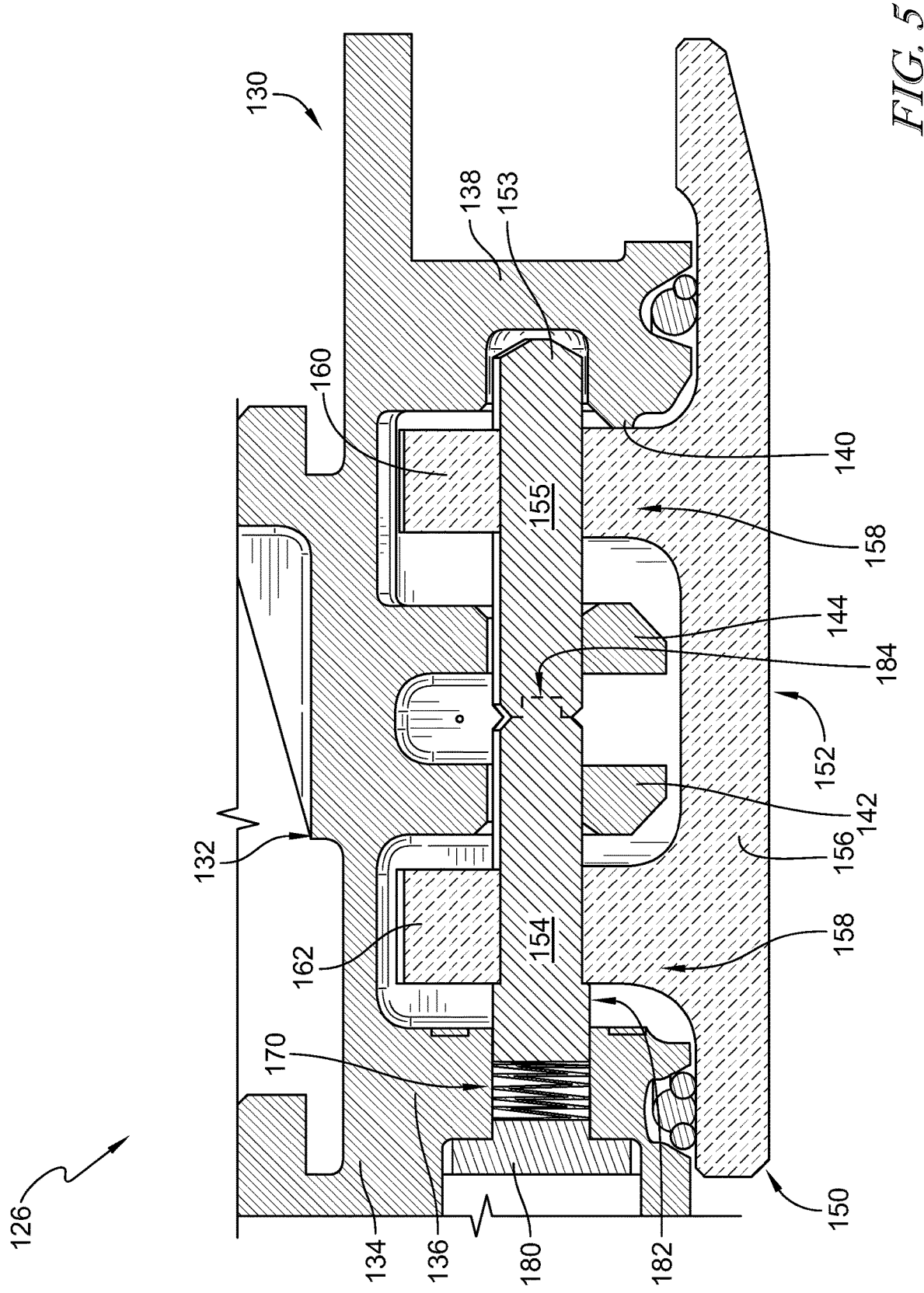
FIG. 5 is detailed view of another turbine shroud showing that the turbine shroud includes a carrier segment, forward, aft flanges, and inner flanges, a blade track segment with radially extending attachment features, a mount pin, and a forward ring spring located axially between a retainer plug of the mount pin and a pin segment of the mount pin, the ring spring biasing a stepped portion of the pin segment into a forward attachment feature of the black track segment such that an aft attachment feature of the blade track segment is biased into sealing engagement with a chordal seal of an aft flange.
Figure 6:
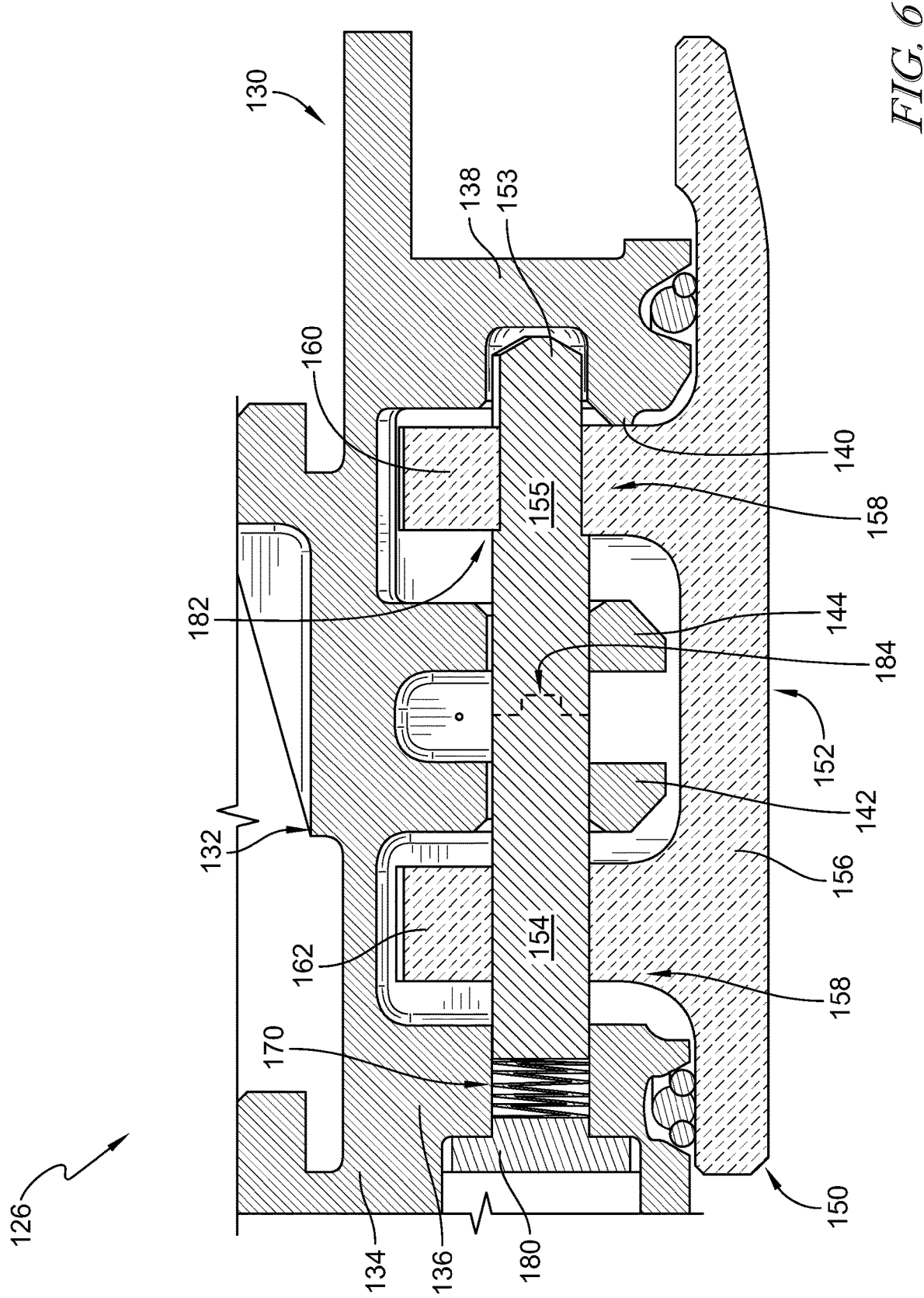
FIG. 6 is detailed view of the turbine shroud of FIG. 5 showing that the turbine shroud includes a forward ring spring located axially between a retainer plug of the mount pin and a pin segment of the mount pin, the ring spring biasing a stepped portion of the pin segment into the aft attachment feature of the black track segment such that the aft attachment feature is biased into sealing engagement with the chordal seal of the aft flange.

Another embodiment of a turbine shroud assembly 126 in accordance with the present disclosure is shown in FIGS. 5 and 6. The turbine shroud assembly 126 is substantially similar to the turbine shroud assembly 26 shown in FIGS. 1-4 and described herein. Accordingly, similar reference numbers in the 100 series indicate features that are common between the turbine shroud assembly 126 and the turbine shroud assembly 26. The description of the turbine shroud assembly 26 is incorporated by reference to apply to the turbine shroud assembly 126, except in instances when it conflicts with the specific description and the drawings of the turbine shroud assembly 126.

The turbine shroud assembly 126 includes a carrier assembly 130 having a carrier segment 132, a blade track assembly 150 having a blade track segment 152, a first mount pin assembly 153, and a first biasing member 170, as shown in FIGS. 5 and 6. In this embodiment, the pin assembly 153 biases the blade track assembly 150 into the seal 140 arranged on the second mount flange 138. The carrier segment 132 is made of metallic materials. The carrier segment 132 further includes an outer wall 134 that extends circumferentially partway around the axis 11. A first mount flange 136 extends radially inward from the outer wall 134. A second mount flange 138 is axially spaced apart from the first mount flange 136 and extends radially inward from the outer wall 134. The carrier segment 132 further includes a third mount flange 142 that extends radially inward from the outer wall 134 of the carrier segment 132 and a fourth mount flange 144 that extends radially inward from the outer wall 134 of the carrier segment and that is spaced apart from and located axially aft of the third mount flange 142.

The blade track segment 152 includes a shroud wall 156 and at least one attachment feature 158, as shown in FIGS. 2-4. The shroud wall 156 includes a radially inner surface 157 that faces the gas path 15, and a radially outer surface 159 that faces outwardly towards the carrier assembly 130. The inner surface 157 cooperates with the turbine wheel assembly 22 to block hot gases in the gas path 15 from passing over the top of the turbine wheel assembly 22. The blade track segment 152 includes at least one attachment feature 158 that extends radially outward from the outer surface 159 of the shroud wall 156. In the illustrative embodiment, the at least one attachment feature 158 includes a first attachment post 160 and a second attachment post 162 that is spaced apart from and located axially aft of the first attachment post 160.

In the illustrative embodiment, the turbine shroud assembly 126 includes the first mount pin assembly 153, as shown in FIGS. 5 and 6. The first mount pin assembly 153 includes a retainer plug 180 that extends axially into the first mount flange 136 and a pin segment 181 that extends axially away from the retainer plug 180, through the attachment feature 158, and into the second mount flange 138 so as to couple the blade track assembly 150 to the carrier segment 132.

In some embodiments, the pin segment 181 may have a circular cross-section, or may have any other suitable cross-section. The pin segment 181 may be formed as a single monolithic pin that extends through the first mount flange 136, the first attachment post 160, the third and fourth mount flanges 142, 144, the second attachment post 162, and into the second mount flange 138. In other embodiments, the pin segment 181 is a split-pin fastener that includes a forward pin 154 that extends into the first mount flange 136, through the first attachment post 160, and through the third mount flange 142, and an aft pin 155 circumferentially aligned with and aft of the forward pin 154 that extends through the fourth mount flange 144, through the second attachment post 162, and into the second mount flange 138. The forward pin 154 is separate from the aft pin 155 so as to allow for independent loading during use in the gas turbine engine.

In the illustrative embodiment in which the pin segment 181 is a split-pin fastener, the forward pin 154 includes an aft axial end face and a connection tab 184 having a smaller diameter than the forward pin that extends axially away from the aft axial end face, as shown in FIGS. 5 and 6. The aft pin 155 includes a forward axial end face and a connection pocket 185 that receives the connection tab 184. The connection tab 184 and connection pocket 185 are sized such that the aft axial end face of the forward pin 154 and the forward axial end face of the aft pin 155 contact each other.

In the illustrative embodiment, the first mount flange 136 includes an axially-extending installation aperture 137 that receives a portion 186 of the retainer plug 180 and a portion of the forward axial end of the pin segment 181, as shown in FIGS. 5 and 6. The retainer plug 180 includes an outer cap 183 formed axially adjacent to the portion 186 of the retainer plug 180 arranged within the axially-extending installation aperture 137. The outer cap 183 fixedly retains the retainer plug 180 against the axially outer surface of the first mount pin 136 so as to prevent removal of the first mount pin 153. The retaining plug 180 may be press fit, threaded, tack welded in place, retained by the vane in front of it, or a combination of the aforementioned methods. The radially extending wall 139 of the second mount flange 138 includes an axially extending recess 187 within which an aft axial end of the pin segment 181 is arranged. An axial space is formed between the axial end of the pin segment 181 and an inner axial wall of the recess 187.

In the illustrative embodiment, the first biasing member 170 is arranged between the portion 186 of the retain plug 180 that extends into the first mount flange 136 and the portion of the forward axial end of the pin segment 181 that also extends into the first mount flange 136, as shown in FIGS. 5 and 6. The pin segment 181 includes a first step 182 defining an axially facing step face. As shown in FIG. 5, the axially facing step face of the first step 182 abuts the axially forward facing surface 143 of the first attachment post 160. Due to the retainer plug 180 being fixed in place, the pin segment 181 is axially biased away from the retainer plug 180 by the first biasing member 170. As a result, the axially facing step face of the first step 182 is biased into the first attachment post 160 and in turn the second attachment post 162 into sealing engagement with the chordal seal 140.

Alternatively, as shown in FIG. 6, the axially facing step face of the first step 182 abuts the axially forward facing surface 147 of the second attachment post 162 such that the biasing of the pin segment 181 via the first biasing member 170 biases the axially facing step face of the first step 182 into the second attachment post 160 and into sealing engagement with the chordal seal 140. In the illustrative embodiments, the first biasing member 170 may be formed as a ring spring. Other suitable springs may be used as well so long as the pin segment 181 is sufficiently biased into engagement with the chordal seal 140.

Figure 7:
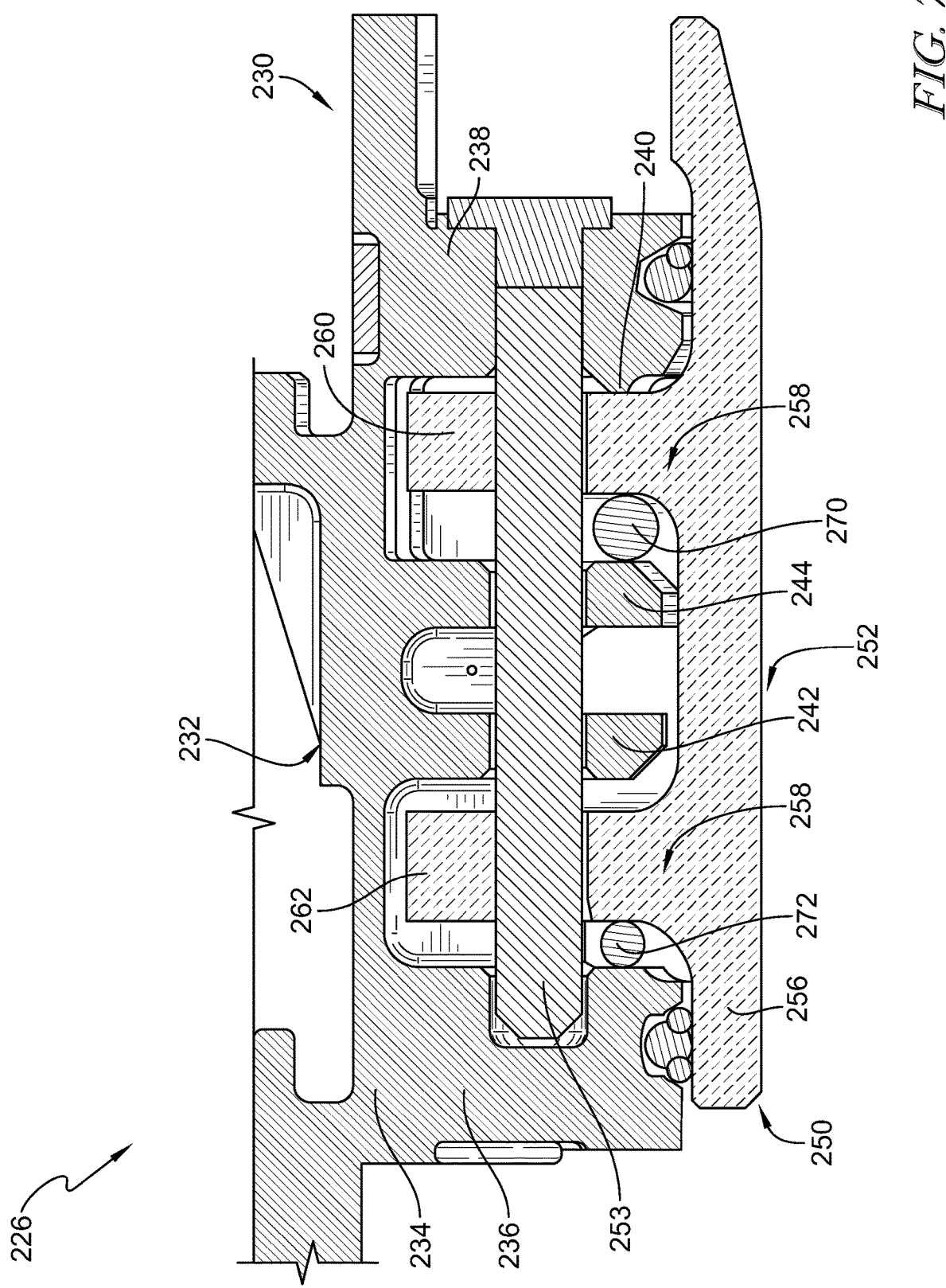
FIG. 7 is detailed view of another turbine shroud showing that the turbine shroud includes a carrier segment, forward, aft flanges, and inner flanges, a blade track segment with radially extending attachment features, a mount pin, and forward and aft braid seals each located axially between a flange and an attachment feature, the braid seals biasing each attachment feature of the black track segment such that an aft attachment feature is biased into sealing engagement with a chordal seal of an aft flange.

Another embodiment of a turbine shroud assembly 226 in accordance with the present disclosure is shown in FIG. 7. The turbine shroud assembly 226 is substantially similar to the turbine shroud assembly 26 and the turbine shroud assembly 126 shown in FIGS. 1-6 and described herein. Accordingly, similar reference numbers in the 200 series indicate features that are common between the turbine shroud assembly 226 and the turbine shroud assembly 26. The description of the turbine shroud assembly 26 is incorporated by reference to apply to the turbine shroud assembly 226, except in instances when it conflicts with the specific description and the drawings of the turbine shroud assembly 226.

The turbine shroud assembly 226 includes a carrier assembly 230 having a carrier segment 232, a blade track assembly 250 having a blade track segment 252, a first mount pin assembly 253, a first biasing member 270, and a second biasing member 272 as shown in FIG. 7. In this embodiment, the first and second biasing members 270, 272 bias the blade track assembly 250 into the seal 240 arranged on the second mount flange 238. The carrier segment 232 is made of metallic materials. The carrier segment 232 further includes an outer wall 234 that extends circumferentially partway around the axis 11. A first mount flange 236 extends radially inward from the outer wall 234. A second mount flange 238 is axially spaced apart from the first mount flange 236 and extends radially inward from the outer wall 234. The carrier segment 232 further includes a third mount flange 242 that extends radially inward from the outer wall 234 of the carrier segment 232 and a fourth mount flange 244 that extends radially inward from the outer wall 234 of the carrier segment and that is spaced apart from and located axially aft of the third mount flange 242.

The blade track segment 252 includes a shroud wall 256 and at least one attachment feature 258, as shown in FIG. 7. The shroud wall 256 includes a radially inner surface 257 that faces the gas path 15, and a radially outer surface 259 that faces outwardly towards the carrier assembly 230. The inner surface 257 cooperates with the turbine wheel assembly 22 to block hot gases in the gas path 15 from passing over the top of the turbine wheel assembly 22. The blade track segment 252 includes at least one attachment feature 258 that extends radially outward from the outer surface 259 of the shroud wall 256. In the illustrative embodiment, the at least one attachment feature 258 includes a first attachment post 260 and a second attachment post 262 that is spaced apart from and located axially aft of the first attachment post 260.

The turbine shroud assembly 226 includes the first mount pin assembly 253, as shown in FIG. 7. The first mount pin assembly 253 includes a retainer plug 280 that extends axially into the second mount flange 238 and a pin segment 281 that extends axially away from the retainer plug 280, through the attachment feature 258, and into the first mount flange 236 so as to couple the blade track assembly 250 to the carrier segment 232.

In the illustrative embodiment, the turbine shroud assembly 226 includes a first biasing member 270 and a second biasing member 272, the first and second biasing members 270, 272 being braid seals that extend circumferentially at least partway around the blade track segment 252, as shown in FIG. 7. The first braid seal 270 is located axially between the first mount flange 236 and the first attachment post 260. The first braid seal 270 abuts the axially aft facing surface 241 of the first mount flange 236 and the axially forward facing surface 243 of the first attachment post 260 such that the first braid seal 270 biases the entire blade track segment 252 axially aft such that an axially aft facing wall 249 of the second attachment post 262 contacts an axially forward facing surface of the chordal seal 240.

In the illustrative embodiment, the turbine shroud assembly 226 further includes a second braid seal 272 located axially between the fourth mount flange 244 and the second attachment post 262, as shown in FIG. 7. The second braid seal 272 abuts the axially aft facing surface 245 of the fourth mount flange 244 and the axially forward facing surface 247 of the second attachment post 262 such that the second braid seal 272 biases the entire blade track segment 252 axially aft such that the axially aft facing wall 249 of the second attachment post 262 contacts the axially forward facing surface of the chordal seal 240. Similarly to the previous embodiments, the turbine shroud assembly 226 may include only a single braid seal or a single attachment post.

Figure 8:
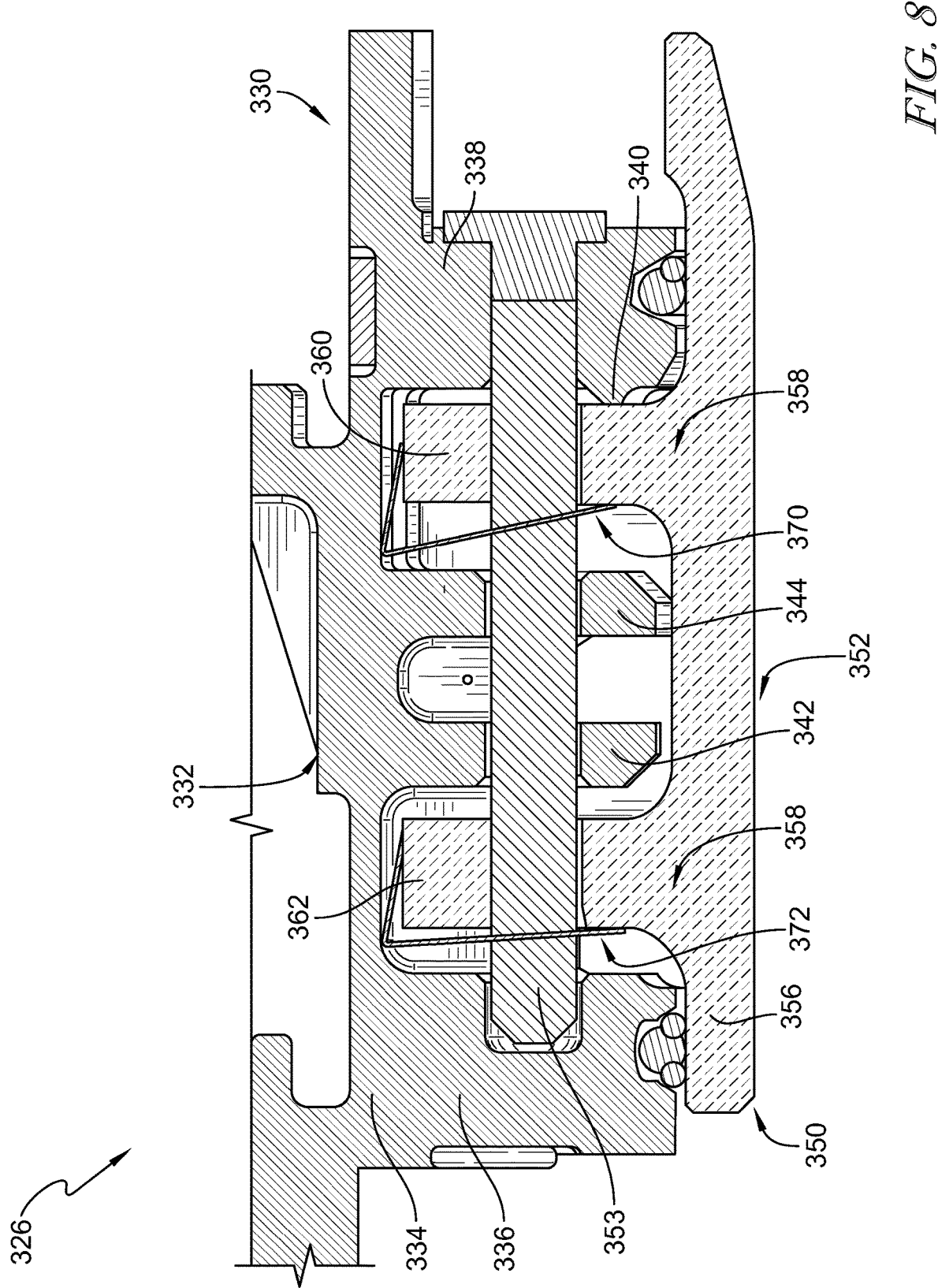
FIG. 8 is detailed view of another turbine shroud showing that the turbine shroud includes a carrier segment, forward, aft flanges, and inner flanges, a blade track segment with radially extending attachment features, a mount pin, and forward and aft springs each located axially between a flange and an attachment feature and radially between an inner radial surface of the carrier segment and an outer radial surface of an attachment feature, the springs biasing each attachment feature of the black track segment such that an aft attachment feature is biased into sealing engagement with a chordal seal of an aft flange.

Another embodiment of a turbine shroud assembly 326 in accordance with the present disclosure is shown in FIG. 8. The turbine shroud assembly 326 is substantially similar to the turbine shroud assembly 26, the turbine shroud assembly 126, and the turbine shroud assembly 226 shown in FIGS. 1-6 and described herein. Accordingly, similar reference numbers in the 300 series indicate features that are common between the turbine shroud assembly 326 and the turbine shroud assembly 26. The description of the turbine shroud assembly 26 is incorporated by reference to apply to the turbine shroud assembly 326, except in instances when it conflicts with the specific description and the drawings of the turbine shroud assembly 326.

The turbine shroud assembly 326 includes a carrier assembly 330 having a carrier segment 332, a blade track assembly 350 having a blade track segment 352, a first mount pin assembly 353, a first biasing member 370, and a second biasing member 372 as shown in FIG. 8. In this embodiment, the first and second biasing members 370, 372 bias the blade track assembly 350 into the seal 340 arranged on the second mount flange 338. The carrier segment 332 is made of metallic materials. The carrier segment 332 further includes an outer wall 334 that extends circumferentially partway around the axis 11. A first mount flange 336 extends radially inward from the outer wall 334. A second mount flange 338 is axially spaced apart from the first mount flange 336 and extends radially inward from the outer wall 334. The carrier segment 332 further includes a third mount flange 342 that extends radially inward from the outer wall 334 of the carrier segment 332 and a fourth mount flange 344 that extends radially inward from the outer wall 334 of the carrier segment and that is spaced apart from and located axially aft of the third mount flange 342.

The blade track segment 352 includes a shroud wall 356 and at least one attachment feature 358, as shown in FIG. 8. The shroud wall 356 includes a radially inner surface 357 that faces the gas path 15, and a radially outer surface 359 that faces outwardly towards the carrier assembly 330. The inner surface 357 cooperates with the turbine wheel assembly 22 to block hot gases in the gas path 15 from passing over the top of the turbine wheel assembly 22. The blade track segment 352 includes at least one attachment feature 358 that extends radially outward from the outer surface 359 of the shroud wall 356. In the illustrative embodiment, the at least one attachment feature 358 includes a first attachment post 360 and a second attachment post 362 that is spaced apart from and located axially aft of the first attachment post 360.

The turbine shroud assembly 326 includes the first mount pin assembly 353, as shown in FIG. 8. The first mount pin assembly 353 includes a retainer plug 380 that extends axially into the second mount flange 338 and a pin segment 381 that extends axially away from the retainer plug 380, through the attachment feature 358, and into the first mount flange 336 so as to couple the blade track assembly 350 to the carrier segment 332.

In the illustrative embodiment, the turbine shroud assembly 326 includes a first biasing member 370 and a second biasing member 372, the first and second biasing members 370, 372 being radial springs, as shown in FIG. 8. A radial portion 371 of the first radial spring 370 is located between and abuts a radially inner surface 335 of the outer wall 334 of the carrier segment and a radially outer surface 361 of the first attachment post 360. Likewise, a radial portion 373 of the second radial spring 372 is located between and abuts a radially inner surface 335 of the outer wall 334 of the carrier segment and a radially outer surface 363 of the second attachment post 362. The radial springs 370, 372 further include radially extending portions 374, 375 that extend radially inwardly away from the radial portions 371, 373. The radial portions 371, 373 of the first and second radial springs 370, 372 are biased radially inwardly, which in turn causes the radially extending portions 374, 375 to be biased in the axially aft direction. As such, the radially extending portions 374, 375 bias the first and second attachment posts 360, 362 in the axially aft direction, and thus the second attachment post 362 into sealing engagement with the chordal seal 340 of the second mount flange 338.

In at least some embodiments, a turbine shroud assembly includes a wave spring that is placed between an aft side of an inner clevis of a carrier segment of the turbine shroud assembly and an aft leg of a CMC blade track segment. Alternatively, a wave spring may be placed between a forward vertical leg extending away from the carrier segment and a front leg of the CMC blade track segment. As a further alternative, a wave spring may be placed between both the inner clevis and aft leg of the CMC blade track segment and the front carrier leg and the front leg of the CMC blade track segment. The wave spring is compressed upon installation and forces the seal segment aft and into contact with a chordal seal of the carrier segment. Such an embodiment may be utilized with a single mount pin or a split-pin assembly, both of which are inserted through the forward leg of the carrier segment. The wave spring could be of a typical ring configuration, linear wave springs, or both. The ring configuration may be arranged around the mount pin and be self-contained.

In an alternative embodiment, a stepped pin is inserted through the forward leg of the carrier segment. The stepped pin is configured such that the major diameter of the pin is larger than the hole in the aft flange or forward flange of the CMC blade track segment. This allows the pin to push aft on the CMC blade track segment. A spring, such as a coil, wave spring, ring spring, or Bellville washer, is inserted in front of the pin and is compressed by a retaining cap. The retaining cap also acts to retain the pin and seal in the cavity from air leaks. The retaining cap may be press fit, threaded, tack welded in place, retained by the vane in front of it, or a combination of the aforementioned methods. Alternatively, the mount pin may include two pins or be a split-pin assembly in which the forward pin has a single large diameter and the aft pin is stepped as discussed above.

In order to facilitate ease of installation, the forward pin may have a nose that inserts into the aft pin. In other embodiments, the mount pin may be inserted from the aft side through an aft leg or flange extending from the outer wall of the carrier segment. The embodiments including the pin inserted from the forward end are simpler to install, provide more options for the type of spring and the location of the spring, and any leakage is to a higher pressure source, reducing the leakage relative to an aft inserted pin. Also, such embodiments can use the vane to retain the plug, thus eliminating any tack welding.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
    a carrier assembly including a carrier segment made of metallic materials and arranged circumferentially at least partway around an axis, the carrier segment having an outer wall, a first mount flange that extends radially inward from the outer wall, and a second mount flange axially spaced apart from the first mount flange and that extends radially inward from the outer wall, the second mount flange including a radially extending wall and a chordal seal that extends axially away from the radially extending wall,
    a blade track assembly including a blade track segment made of ceramic matrix composite materials and a first mount pin assembly, the blade track assembly supported by the carrier to locate the blade track segment radially outward of the axis and define a portion of a gas path of the turbine shroud assembly, and the blade track segment including a shroud wall that extends circumferentially partway around the axis and an attachment feature that extends radially outward from the shroud wall, and the first mount pin assembly including a retainer plug extending axially into the first mount flange and a pin segment extending axially away from the retainer plug, through the attachment feature, and into the second mount flange so as to couple the blade track assembly to the carrier segment, and
    a first biasing member arranged axially between and engaged with the retainer plug of the first pin mount assembly and the pin segment such that a portion of the pin segment engages the attachment feature of the blade track segment so as to bias the attachment feature into engagement with the chordal seal of the second mount flange.

2. The turbine shroud assembly of claim 1, wherein the attachment feature includes a first attachment post that extends radially outward from the shroud wall and that defines an axially forward facing surface, and a second attachment post that extends radially outward from the shroud wall and that is axially spaced apart from the first attachment post, wherein the pin segment includes a first step defining an axially facing step face, and wherein the axially facing step face abuts the axially forward facing surface of the first attachment post such that the biasing of the pin segment via the first biasing member biases the axially facing step face into the first attachment post and the second attachment post into sealing engagement with the chordal seal.

3. The turbine shroud assembly of claim 2, wherein the attachment feature is located axially between the first mount flange and the second mount flange.

4. The turbine shroud assembly of claim 3, wherein the first mount flange includes an axially-extending installation aperture that receives a portion of the retainer plug and a portion of the pin segment such that the first biasing member is located within the axially-extending installation aperture.

5. The turbine shroud assembly of claim 4, wherein the carrier segment further includes a third mount flange that extends radially inward from the outer wall of the carrier segment, wherein the third mount flange is located axially between the first mount flange and the second mount flange, and wherein the pin segment extends axially through the first attachment post, the third mount flange, and the second attachment post.

6. The turbine shroud assembly of claim 5, wherein the carrier segment further includes a fourth mount flange that extends radially inward from the outer wall of the carrier segment and that is spaced apart from and located axially aft of the third mount flange, wherein the third mount flange is located axially between the first mount flange and the fourth mount flange, wherein the fourth mount flange is located axially between the third mount flange and the second mount flange, and wherein the pin segment extends axially through the first attachment post, the third mount flange, the fourth mount flange, and the second attachment post.

7. The turbine shroud assembly of claim 6, wherein the first attachment post is located axially between the first mount flange and the third mount flange, and wherein the second attachment post is located axially between the fourth mount flange and the second mount flange.

8. The turbine shroud assembly of claim 7, wherein the radially extending wall of the second mount flange includes an axially extending recess within which an axial end of the pin segment is arranged, and wherein an axial space is formed between the axial end of the pin segment and an inner axial wall of the recess.

9. The turbine shroud assembly of claim 8, wherein the pin segment is a split-pin fastener that includes a forward pin that extends into the first mount flange, through the first attachment post, and through the third mount flange, and an aft pin circumferentially aligned with and aft of the forward pin that extends through the fourth mount flange, through the second attachment post, and into the second mount flange, and wherein the forward pin is separate from the aft pin so as to allow for independent loading during use in the gas turbine engine.

10. The turbine shroud assembly of claim 9, wherein the forward pin includes an aft axial end face and a connection tab having a smaller diameter than the forward pin that extends axially away from the aft axial end face, and wherein the aft pin includes a forward axial end face and a connection pocket that receives the connection tab, and wherein the connection tab and connection pocket are sized such that the aft axial end face of the forward pin and the forward axial end face of the aft pin contact each other.

11. The turbine shroud assembly of claim 1, wherein the attachment feature includes a first attachment post that extends radially outward from the shroud wall and a second attachment post that extends radially outward from the shroud wall, that is spaced apart from and located axially aft of the first attachment post, and that defines an axially forward facing surface, wherein the pin segment includes a first step defining an axially facing step face, and wherein the axially facing step face abuts the axially forward facing surface of the second attachment post such that the biasing of the pin segment via the first biasing member biases the axially facing step face into the second attachment post and the second attachment post into engagement with the chordal seal.

12. The turbine shroud assembly of claim 11, wherein the carrier segment further includes a third mount flange that extends radially inward from the outer wall of the carrier segment, wherein the third mount flange is located axially between the first mount flange and the second mount flange, and wherein the first attachment post is located axially between the first mount flange and the third mount flange and the second attachment post is located axially between the third mount flange and the second mount flange.

13. The turbine shroud assembly of claim 12, wherein the first mount flange includes an axially-extending installation aperture that receives a portion of the retainer plug and a portion of the pin segment such that the first biasing member is located within the axially-extending installation aperture.

14. A turbine shroud assembly for use with a gas turbine engine, the turbine shroud assembly comprising
a carrier segment arranged circumferentially at least partway around an axis, the carrier segment having a first mount flange that extends radially inward and a second mount flange axially spaced apart from the first mount flange and that extends radially inward, the second mount flange including a radially extending wall and a chordal seal that extends axially away from the radially extending wall,
a blade track assembly including a blade track segment and a first mount pin assembly, the blade track segment including a shroud wall and an attachment feature that extends radially outward from the shroud wall, and the first mount pin assembly coupling the blade track assembly to the carrier segment and including a retainer plug extending axially into the first mount flange and a pin segment extending axially away from the retainer plug, and a first biasing member arranged axially between and engaged with the retainer plug of the first pin mount assembly and the pin segment such that a portion of the pin segment engages the attachment feature of the blade track segment so as to bias the attachment feature into engagement with the chordal seal of the second mount flange.

15. The turbine shroud assembly of claim 14, wherein the attachment feature includes a first attachment post that extends radially outward from the shroud wall and that defines an axially forward facing surface, wherein the pin segment includes a first step defining an axially facing step face, and wherein the axially facing step face abuts the axially forward facing surface of the first attachment post such that the biasing of the pin segment via the first biasing member biases the axially facing step face into the first attachment post and the blade track segment into sealing engagement with the chordal seal.

16. The turbine shroud assembly of claim 15, wherein the first mount flange includes an axially-extending installation aperture that receives a portion of the retainer plug and a portion of the pin segment such that the first biasing member is located within the axially-extending installation aperture.

17. The turbine shroud assembly of claim 16, wherein the first mount pin assembly is a split-pin fastener that includes a forward pin that extends into the first mount flange and an aft pin circumferentially aligned with and aft of the forward pin that extends into the second mount flange, and wherein the forward pin is separate from the aft pin so as to allow for independent loading during use in the gas turbine engine.

18. The turbine shroud assembly of claim 17, wherein the forward pin includes an aft axial end face and a connection tab having a smaller diameter than the forward pin that extends axially away from the aft axial end face, and wherein the aft pin includes a forward axial end face and a connection pocket that receives the connection tab, and wherein the connection tab and connection pocket are sized such that the aft axial end face of the connection tab and the forward axial end face of the aft pin contact each other.

19. The turbine shroud assembly of claim 15, wherein the second mount flange includes an axially-extending installation aperture that receives a portion of the retainer plug and a portion of the pin segment such that the first biasing member is located within the axially-extending installation aperture, and wherein the first biasing member exerts a pulling biasing force on the pin segment.

20. A method of forming a turbine shroud assembly, comprising
providing a carrier assembly including a carrier segment made of metallic materials and arranged circumferentially around an axis, the carrier segment having an outer wall, a first mount flange that extends radially inward from the outer wall, and a second mount flange axially spaced apart from the first mount flange and that extends radially inward from the outer wall, the second mount flange including a radially extending wall and a chordal seal that extends axially away from the radially extending wall,
providing a blade track assembly including a blade track segment made of ceramic matrix composite materials and a first mount pin assembly, the blade track assembly supported by the carrier to locate the blade track segment radially outward of the axis and define a portion of a gas path of the turbine shroud assembly, and the blade track segment including a shroud wall that extends circumferentially partway around the axis and an attachment feature that extends radially outward from the shroud wall, coupling the blade track assembly to the carrier segment via the first mount pin assembly, the first mount pin assembly including a retainer plug extending axially into the first mount flange and a pin segment extending axially away from the retainer plug, through the attachment feature, and into the second mount flange, and arranging a first biasing member axially between the retainer plug of the first pin mount assembly and the pin segment such that a portion of the pin segment engages the attachment feature of the blade track segment so as to bias the attachment feature into sealing engagement with the chordal seal of the second mount flange.

* * * * *